(12) United States Patent
Orpen

(10) Patent No.: US 6,253,532 B1
(45) Date of Patent: Jul. 3, 2001

(54) WRAPPING APPARATUS

(75) Inventor: Kenneth Stephen Eddin Orpen, Jade House, Croydon Road, Westerham, Kent TN1X 1TX (GB)

(73) Assignees: Kenneth Stephen Eddin Orpen, Kent (GB); ITW Mima Films LLC, Glenview, IL (US)

( * ) Notice: Subject to any disclaimer, the term of this patent is extended or adjusted under 35 U.S.C. 154(b) by 0 days.

(21) Appl. No.: 09/331,392

(22) PCT Filed: Dec. 12, 1997

(86) PCT No.: PCT/GB97/03426

§ 371 Date: Aug. 25, 1999

§ 102(e) Date: Aug. 25, 1999

(87) PCT Pub. No.: WO98/26648

PCT Pub. Date: Jun. 25, 1998

(30) Foreign Application Priority Data

Dec. 18, 1996 (GB) .................................................. 9626234

(51) Int. Cl.⁷ ...................................................... B65B 53/00
(52) U.S. Cl. ................................... 53/441; 53/399; 53/556
(58) Field of Search ............................... 53/399, 556, 441

(56) References Cited

U.S. PATENT DOCUMENTS

| 4,409,784 | * | 10/1983 | VanGinhoven et al. | 56/341 |
| 5,740,662 | * | 4/1998 | Royneberg et al. | 53/556 |
| 5,797,240 | * | 8/1998 | Martin-Cocher et al. | 53/399 |
| 5,816,026 | * | 10/1998 | Orpen | 53/441 |
| 5,979,146 | * | 11/1999 | Orpen | 53/441 |

FOREIGN PATENT DOCUMENTS

| 4120733 | | 1/1993 | (DE) . | |
| 4201485 | | 7/1993 | (DE) . | |
| 291 483 | * | 10/1988 | (EP) | B65B/11/04 |
| 2083002 | | 3/1982 | (GB) . | |

* cited by examiner

*Primary Examiner*—Peter Vo
*Assistant Examiner*—Hemant M. Desai
(74) *Attorney, Agent, or Firm*—Thomas J. Engellenner; Tram Anh T. Nguyen; Nutter, McClennen & Fish, LLP

(57) ABSTRACT

Wrapping apparatus for wrapping an object such as an agricultural bale with stretched film has a powered stretch film dispenser mounted to a swing arm disposed above a bale support; the swing arm is connected to a drive unit by which the arm is swung causing the dispenser to execute continuous circular motion about a bale on the bale support, the latter being operable to spin the bale slowly about an axis in the plane of motion of the dispenser. The dispenser derives power for positively dispensing wrapping film from the arm drive unit by way of a mechanical drive transmission. In use, turns of film are wrapped in overlapping, angularly displaced fashion about the bale and the rate at which film is dispensed always bears a fixed relationship to the speed of the drive unit, the angular speed of the swing arm and the rate at which turns are wrapped around the bale.

13 Claims, 1 Drawing Sheet

WRAPPING APPARATUS

BACKGROUND OF THE INVENTION

This invention relates to wrapping apparatus for applying stretch wrappings to objects. The apparatus is usable in general industry, e.g. for wrapping palletised articles, but is primarily intended for use in agriculture.

In particular, the apparatus disclosed herein has been devised principally for use in the field for wrapping bales of agricultural produce such as silage, hay and straw, as an alternative-to bagging the bale. Often there is a need to wrap a bale in such a way that ingress of air or oxygen is eliminated substantially or completely. Wrapping film is costly and ultimately discarded, so there is a need to maximise its economic usage.

In agriculture a bale, e.g. of silage, is wrapped with stretch film by making numerous overlapping turns of film around the bale so as to form a completely-enveloping "bandage". This is accomplished by relative rotation between the bale and a film dispenser. The dispenser may be fixed. In that case, the bale is rotated about two axes until the necessary complete film coverage has been wound about the bale. Alternatively, the dispenser might be rotated about the bale while the latter is rotated appropriately, again until a complete film wrapping has been formed.

GB-A-2 159 489 discloses a bale-wrapping apparatus connectible to a farm tractor. The typical cylindrical bale is rotated horizontally about its main axis and about a vertical axis while a fixed dispenser pays out film from a film supply roll to the rotating bale. The film is drawn from the roll thanks to rotation of the bale to which an end of the film has been attached. Since the bale is rotating about two axes, in due course it becomes covered completely with overlapping turns of film. The film is applied to the bale under tension. That is, it is stretched while passing between the dispenser and the bale. In essence, this is achieved by the film being pulled by the rotating bale from the supply roll, the latter being braked in some way. The film is extended and stretched as it is drawn from the dispenser toward the bale. The amount of stretch depends on the surface velocity of the bale and the equivalent, slower speed of film leaving the film roll, the latter being dependent on the braking or retarding force developed at or by the dispenser to which the roll is mounted.

EP-A-0 242 975 discloses a similar apparatus. Film leaves the dispenser again due to the pull exerted by the rotating bale, which pull is resisted by a braking effort at the dispenser. In this case, the resistance is created by a controllably-resistive hydraulic circuit including a pump operated by the supply roll as it rotates when film is being drawn off its supply roll.

In both these prior apparatuses, film tension is developed between the bale and dispenser thanks to the pull exerted by the rotating bale being resisted by the dispenser.

This means of tensioning the film has severe practical drawbacks. In particular, the lengthwise film stretch is accompanied by a transverse shrinkage. This obviously is not beneficial if cost-effective film usage is desired. Moreover, the amount by which the film can be stretched by this tensioning method is limited. It is found that attempts to increase the stretch, by increasing the speed of rotation of the bale and/or by increasing the dispenser braking, are only partially successful. Most films can only be stretched this way by disappointingly small amounts and if they are exceeded, holes appear in the film and/or it may break. It is very difficult to match bale speed and dispenser braking for optimum film usage.

Nowadays, wrapping or encapsulating a bale to provide a degree of protection to the contents of the bale employs extensible and partially elastic or stretchable polymeric film. Films used are usually clear, white, black or some other color or combinations of colors. The films used may include an ultra violet light inhibitor to provide enhanced protection to the encapsulated material. Some films are provided with a tack or low level of self-adhesive on one surface or on both surfaces, to improve the sealing characteristics of the layers and joints on the bale.

Polymeric film is expensive and hence for this reason there is a desire to reduce the amount of film used to wrap a bale. Moreover, polymeric film is not readily biodegradable, and once the protective wrapping is removed, it is not easily reusable, so on environmental grounds there is again a need to maximise efficiency of film usage.

Film usage is likely to rise significantly through greater use in agriculture particularly for wrapping bales of silage. Currently, approximately only 30% of the UK silage crop is made in this way and the remaining 70% is still being made in environmentally hazardous outdoor clamps.

It is important to ensure that the encapsulation process is complete and thorough, when wrapping a bale of silage. Firstly the contents of the bale must be isolated from the atmosphere for the ensiling process to take place, turning the bale of raw grass into a quantity of high value long life animal feed. Secondly, seepage from the encapsulation of the contaminative, poisonous, acidic products that are produced as by-products at certain times during the ensiling process must be contained.

It will be understood, therefore, that when wrapping bales of silage it is of prime importance to ensure the best possible encapsulation of every single bale.

The present invention permits the application of film to a bale under tension, where control of tension is significantly better than has hitherto been economically possible. Prior film dispensing systems, where the film is pulled from a retarding film dispensing device often lead to film perforation and narrowing or 'necking' of the film due to the occurrence of uncontrolled excess tension, and uneven tensioning. An unsatisfactory, uneven distribution of film over the surface of the bale results, which may well not be airtight or liquid-tight.

With systems commonly in use, inadequate film tensioning is also known to happen at times. Then, the film is applied too loosely, that is, without enough tension to cause it to adhere firstly to the bale and secondly to the preceding layers resulting in an unsealed package.

With currently available systems of the kind discussed above, only low percentage stretch or elongation can be obtained reliably so film usage is undesirably high. At best, stretch percentages may be only 40–70%.

It has been demonstrated that power stretching the film in the dispenser can elongate the film reliably, without significant transverse shrinking, holing or tearing problems, at up to 200% or more. Highly efficient film usage can thus be secured. In power stretching, the film from the supply roll is passed around several rollers and through the nip or nips of two or more of the rollers, selected ones of which are positively driven at appropriate surface speeds so as to stretch the film as it passes through the dispenser and before it is fed therefrom to the bale. However, the present inventor has found from long experience that it is necessary to inter-relate and thus control the drives to the power stretch dispenser and to the bale rotating means.

In his WO94/20367, the present inventor discloses a wrapping apparatus where the dispenser and bale rotating drives are hydraulic motors. The dispenser motor is driven off the exhaust of bale rotating motor and this makes it possible to control and fix the ratio of the outputs of the two motors. In this way, highly reliable and cost-efficient film usage is possible.

The system of WO94/20367 is of great simplicity but can be difficult in practice to optimise, especially when produced as a retrofit or accessory for farmers' existing tractors. There are numerous makes and types of tractor in existence, and large numbers of hydraulic supply systems, and all in different states of upkeep. Under the circumstances, "tuning" the system of WO94/20367 to any particular tractor, and maintaining its efficient time, can be extremely time consuming.

A related system developed from WO94/20367 is disclosed in PCT/GB96/01458. In this system, benefits are obtained by running the bale rotating motor off the exhaust of the dispenser motor, again obtaining a fixed ratio of the outputs of the two motors. More stable operation may be attainable with this system, the hydraulics of which have been developed to make the system more adjustable, Even so, this system is as difficult and time consuming to set up and maintain at peak efficiency as the former, and is more expensive.

SUMMARY OF THE INVENTION

An object of the present invention is to provide a wrapping apparatus with a powered-stretch film dispenser operable to deliver stretched film at a rate that is substantially directly related to the rate at which turns of film are wound around the object or bale to be wrapped, which apparatus is simple to construct, set up and maintain.

In such an apparatus according to the invention, there is means to support and means to drive one of the object or bale and the film dispenser rotationally relative to the other, to wind turns of film around the object or bale. From a power take off point related to the drive means, a direct, mechanical drive transmission is taken to the power stretch rollers of the dispenser. The transmission can feature such conventional components as pulleys and flexible toothed or V-belts, chains and sprockets, shafts and gears, or a mixture thereof. The arrangement is such that the rate at which stretched film is delivered from the dispenser is always at a chosen, fixed ratio to the speed of the drive means, and hence to the rate at which turns of film are wound on the object or bale. The actual ratio can be set easily by appropriate choice of gearing of the drive transmission, and can be changed easily without specialised knowledge by any ordinarily equipped user or mechanic.

Preferably, it is the film dispenser which is mounted for rotation about the bale to wind film thereon. The dispenser traces a circular path e.g. in a substantially horizontal plane. Meanwhile, a bale rotation means is operable to spin the bale slowly about a substantially horizontal axis. Thanks to this spinning of the bale, the turns of film will overlap and progressively cover the entire surface of the bale.

Hydraulic systems such as disclosed in WO94/20367 and PCT/GB96/01458 strive to establish a fixed ratio between the outputs of the bile rotation motor and the dispenser motor. However, in practice the desired fixed ratio can be extremely difficult to secure, due among other factors to hydraulic back pressures, flow variations and thermal effects. In the result, the desired constancy between stretch and film feed may be practically unattainable. The present invention, however, achieves this objective without requiring any sophisticated or complex control systems.

The invention is defined in claim 1 appended hereto, and preferred features are set out in the claims dependent on claim 1.

BRIEF DESCRIPTION OF THE DRAWINGS

The invention will now be described by way of example with reference to the accompanying drawings, in which.

DETAILED DESCRIPTION OF THE DRAWINGS

Figure 1:
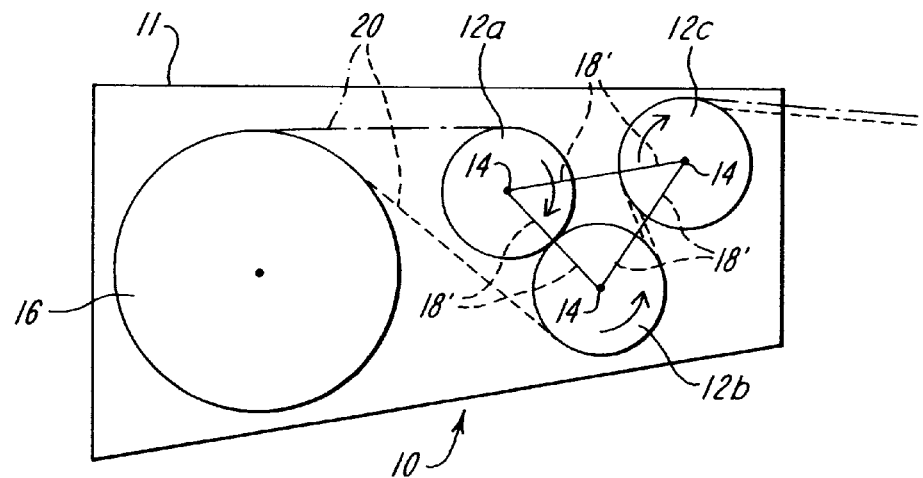
FIG. 1 is a schematic plan view of a power-stretch film dispenser.

The power-stretch film dispenser 10 has a base 11 on which several rollers 12a, b, c are journalled for rotation about their vertically-disposed longitudinal axes 14. The base 11 also supports a film supply roll 16 for free rotation about its longitudinal axis, which also is vertically disposed. This dispenser 10 is shown as having three rollers. Depending on stretch requirements, a dispenser might have only two rollers, or more than three. All, or selected ones, of the rollers (e.g. 12a, 12c) are fast for rotation with gears 18' meshing with one another, or with sprockets and chains, or with pulleys and flexible belts (not shown). By these means, the various rollers are linked for joint rotation at preselected speed ratios determined by the gearing, sprocket or pulley diameter ratios. By appropriate selection of the speed ratios and by appropriate threading of the film 20 around the rollers 12 a, b, c, (two possible routes being shown in FIG. 1) desired fixed stretch percentages can be conferred on film fed from the dispenser 10. Stretch percentages as high as 300% can be designed into the dispenser 10. The percentage stretch is independent of the rate at which film is actually dispensed.

Depending on the number of rollers, one or more may be idlers. In the case illustrated, roller 12b can be an idler. One roller 12a is a driven roller and is driven by means described hereafter. In turn, it is a drive roller for the other driven roller(s) e.g. 12c via the gearing, chain/sprocket system or pulley/V-belt system.

The rollers 12a, b, c are shown as having the same diameters, but this is not essential. Indeed, by using rollers of different diameters, different surface speeds will occur as they rotate. By this means as well as by suitable choice of gearing or pulley diameter, it is possible easily to set the dispenser to develop chosen stretch percentages within a wide range of choices.

The film dispenser 10 is part of a bale-wrapping machine 22. In use of the machine, a bale 24 is wrapped with successive, overlapping turns of film 20 until it is completely covered by one or more complete layers of film.

The machine 22 could be a fixed installation to which bales are brought for wrapping, but in general will be transportable for use in the field. As shown, for the latter purpose, the machine has a base or chassis 25 with ground-engaging wheels 39 and a hitch 41 at one end for connection to a tractor.

Figure 2:
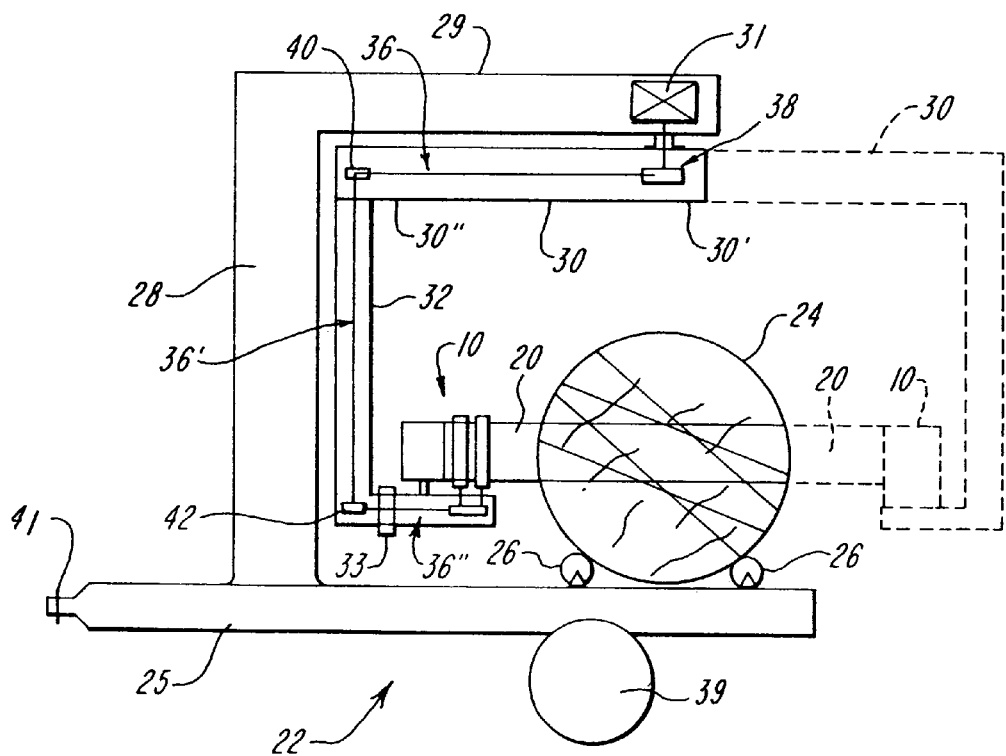
FIG. 2 is a schematic bale wrapping machine embodying the invention.

The machine 22 has means for establishing a relative rotation between the bale 24 and the film dispenser 10, whereby the successive turns of film are wound about the bale 24. The bale 24 could be mounted on a rotary support to spin about a vertical axis adjacent the dispenser 10 for this purpose, e.g. as taught in any of prior patent cases mentioned earlier. However, in the preferred embodiment shown in the drawings, the dispenser 10 is mounted to rotate about the bale 24 to wind the film around the bale. The dispenser travels continuously around a circular path with the bale at its centre, the path being horizontal or approximately horizontal. The bale 24 is cradled on a pair of spaced-apart rolls 26 shown transverse to the chassis 25. By means not shown, one or each of the rolls 26 is slowly rotated to spin the bale slowly about an axis in the path of travel of the dispenser 10. The bale may be spun continuously, or stepwise. The effect of spinning the bale 24 while the dispenser is rotating about the bale is, of course, to ensure that the turns of film 20 gradually cover the entire surface of the bale 24. The turns overlap, as shown in FIG. 2, and ultimately the bale will be completely encapsulated in film. Several layers of film may be applied to the bale.

If desired, the machine 22 could include bale height adjustment means, for centering the bale on the path of travel of the dispenser, and operable to raise or lower the rolls 26. However, if all bales to be film encapsulated are nominally the same size, height adjustment means may be omitted. It is not essential that the turns of film 20 are centred diametrically of the bale 24 being encapsulated.

To support the dispenser 10 so as to orbit around the bale 24, the machine has a fixed support 28 upstanding from the chassis 25, with a horizontal boom portion 29 extending over the bale. Beneath this horizontal boom portion 29 there is a horizontal swing arm 30. The arm 30 is cantilevered from one end 30' and is there connected to a drive unit 31 within boom portion 29 of the support 28. The unit 31 when operated causes the arm 30 to rotate in a substantially horizontal plane above the bale 24. The opposite, free end 30" of the swing arm 30 has a depending leg 32. To the lower end of leg 32 the base 11 of the dispenser 10 is secured by a mounting 33. The mounting may, if desired, be constructed to enable the height of the dispenser to be adjusted.

The dispenser rollers 12a–c are driven, as aforesaid, and obtain their drive via a mechanical drive transmission 36, 36', 36" from a power take-off means 38 associated with the arm drive unit 31. Thanks to the power take-off means and drive transmission, the power stretch dispenser 10 delivers stretched film 20 at a linear rate which is always fixedly related to the angular speed of rotation of the swing arm 30. Should the speed of the swing arm 30 fluctuate for any reason, the dispensing rate will fluctuate keeping in step. Thus, the rate at which film 20 is dispensed always stays fixedly related to the speed at which turns of film are wound around the bale 24. In the result, the turns will be wound on the bale under uniform tension even if the arm 30 rotates at non-uniform speed for any reason. Problems of snatching, which might snap the film, of overrun, excessive stretching or development of slack in the wrapping are all simply and effectively eliminated by mechanically coupling the power stretch dispenser 10 to the arm rotation means.

The mechanical drive transmission 36, 36', 36" can employ any of shafting and gearing, chains and sprockets, and pulleys and flexible belts, whichever happen to be the most convenient. By way of example, part 36 of the transmission can comprise an endless chain looped around a sprocket forming part of the power take-off means 38 and around another sprocket 40. Sprocket 40 is non-rotationally fastened to part 36' of the transmission. Part 36' can comprise a rigid shaft terminating in another sprocket which in turn is connected with the driven roller 12a by another chain and sprocket, these forming part 36" of the transmission. The entire transmission 36, 36', 36" could be composed of shafts, drivingly interconnected through appropriate bevel gearing.

Irrespective of the exact way in which transmission parts 36, 36' and 36" are implemented, it will be understood that its "gearing" will be chosen, e.g. by trial and error, to achieve a desired ratio between the linear film delivery rate and the rate at which turns are applied to the bale 24. The gearing will be set by appropriate matching of gear, pulley or sprocket sizes, as will be readily understood by the addressee.

The drive unit 31 can be of any desired form. It could be an hydraulic motor powered from a tractor's hydraulic system, or from a self-contained hydraulic system of the machine 10. Alternatively, it could be the final part of a geared drive system connectible to the tractor's PTO unit. Equally, it could be an electric motor which derives its power from a generator driven by the tractor. Yet again, it could be a small power unit operated by internal combustion.

It may be desirable for the connection between the swing arm 30 and its drive unit 31 to be disengageable to enable the arm to remain stationary while a length of film is dispensed prior to commencing the wrapping of the bale. Alternatively, it may be arranged for the dispenser gears to be disengageable to let a user easily pull a length of film from the dispenser. The said length of film is then attached to the bale, e.g. by tying to the baling string or netting already holding the bale together.

Thereafter, the arm 30 is driven continuously in its orbit around the bale 24. In consequence, the dispenser 10 dispenses the duly stretched film which is wound about the bale while the latter spins, thanks to the rolls 26. Within a short time, the bale will be completely enveloped by a coherent film covering. When the desired covering has been built up, the machine 22 will be stopped. The film will be severed in any convenient way and the wrapped bale unloaded from the machine, which is then ready to receive another bale for wrapping.

The apparatus disclosed can wrap bales of various sizes, but for wrapping smaller bales, it might be desired to dispose the dispenser closer to them. To this end, the swing arm 30 could include, at intervals along its length, one or more alternative anchorages for the depending leg 32. Part 36 of the drive transmission would be adaptable to suit, as by substituting endless chains or belts of appropriate lengths. In a similar way, the dispenser 10 could be coupled to the leg 32 by mountings 33 of different lengths, part 36" of the transmission being appropriately adaptable to match the chosen length.

It will be appreciated that what is illustrated is purely schematic, and a machine embodying the invention could take numerous forms within the scope of the following claims. As shown, the bale is of round section, i.e. cylindrical, but the apparatus is equally capable of wrapping bales of square or rectangular section.

What is claimed is:

1. Apparatus for wrapping an object with stretch film, comprising:

a power-stretch film dispenser having a plurality of driven rollers rotatable at different surface speeds for drawing film from a supply, for stretching it and for dispensing the stretched film;

means to support the object;

drive means to drive one of the dispenser and the object rotationally relative to the other, for winding turns of film dispensed by the dispenser about the object; and a direct mechanical drive transmission linking the drive means and the dispenser for rotating at least one of the dispenser rollers, whereby the speed of the drive means controls the speed of at least one of the dispenser rollers such that in use the rate at which stretched film is dispensed is proportional to the rate at which turns of film are wound around the object.

2. Apparatus according to claim 1, wherein the different surface speeds of the driven rollers are capable of stretching the film being dispensed longitudinally at up to 300%.

3. Apparatus according to claim 1, wherein the dispenser is mounted on a rotational support which is driven by said drive means in circulatory motion about the object, for winding the film thereabout.

4. Apparatus according to claim 3, including an object support operable to spin the object about an axis substantially perpendicular to the axis of the circulatory motion of the dispenser, in use to cause successive turns of film to be angularly displaced and to overlap one another.

5. Apparatus according to claim 4, wherein the dispenser is mounted to circulate around the object support in a substantially horizontal plane, and the spin axis is located in this plane.

6. Apparatus according to claim 1, wherein the said drive transmission has drive components selected from endless chains and sprockets, endless flexible belts and pulleys, shafting and gears, or combinations of such components.

7. Apparatus according to claim 1, wherein the dispenser is mounted to rotate about a support for the object on a depending leg extending from a swing arm disposed above the object support, which arm is coupled to the said drive means.

8. Apparatus according to claim 7, wherein the apparatus is a wheeled vehicle connectible to a tractor and has a base with an upstanding support from which a horizontal boom projects, the drive means being carried by the boom and the swing arm being coupled at one end to the drive means.

9. Apparatus according to claim 1, wherein the drive means is any of a hydraulic motor, an electric motor, a motor driven by internal combustion and a final drive unit connectible to a power take-off unit of a tractor.

10. A method of wrapping an object with stretch film by winding turns of stretched film about the object, wherein the rate at which stretched film is dispensed is proportional to the rate at which turns of film are wound around the object, and wherein a power-stretch film dispenser is used, which has a plurality of driven rollers rotatable at different surface speeds for drawing film from a supply, for stretching it and for dispensing the stretched film, either the dispenser or the object is supported for rotation and is driven rotationally relative to the other by a drive means having a power take-off point, for winding turns of film dispensed by the dispenser about the object, the drive means being connected to at least one of the dispenser rollers via a direct mechanical drive transmission for rotating the roller, whereby the speed of the drive means controls the speed of at least one of the dispenser rollers.

11. Wrapping apparatus for winding stretch film about an object, comprising a powered stretch film dispenser having a plurality of driven rollers rotatable at different surface speeds for stretching film while drawing it from a supply, and for dispensing the stretched film, means to support one of the object and the dispenser rotationally relative to the other, to enable stretched film dispensed by the dispenser to be wrapped round and round the object, a drive means or motor to rotate the rotationally-supported one of the object and the dispenser, the drive means being connected to at least one of the dispenser rollers via a direct mechanical drive transmission for rotating the rollers, whereby the speed of the drive means controls the speed of at least one of the dispenser rollers, whereby said drive means or motor provides motive power both for rotating the rotationally-supported one of the dispenser and the object and for driving the driven rollers, whereby in use the rate at which stretched film is dispensed is kept proportional to the rate at which turns of film are wound around the object.

12. A method of wrapping an object with stretched film by winding turns of said film around the object, wherein the rate at which turns of film are wrapped around the object is kept proportional to the rate at which the film is dispensed from a supply thereof; wherein a powered stretch film dispenser is used, the dispenser having a plurality of driven rollers rotatable at different surface speeds, for stretching film while drawing it from the supply, and for dispensing the stretched film; wherein one of the dispenser and the object is rotated relative to the other by a drive means having a power take-off point so that stretched film dispensed by the dispenser is wrapped round and round the object, the drive means being connected to at least one of the dispenser rollers via a direct mechanical drive transmission for rotating the rollers, whereby the speed of the drive means controls the speed of at least one of the dispenser rollers.

13. An apparatus for wrapping an object with stretch film, comprising:

a power stretch film dispenser having a plurality of driven rollers rotatable at different surface speeds for drawing film from a supply, for stretching the film and for dispensing the film; and a support and driver to rotate one of the dispenser and the object relative to one another, and for winding turns of film dispensed by the dispenser about the object;

a direct mechanical drive transmission linking the driver and the dispenser for rotating at least one of the dispenser rollers, whereby the speed of the drive means controls the speed of at least one of the dispenser rollers; and whereby in use the rate at which stretched film is dispensed is proportional to the rate at which turns of film are wound around the object.

* * * * *